US009831667B2

(12) United States Patent
Yseboodt et al.

(10) Patent No.: US 9,831,667 B2
(45) Date of Patent: Nov. 28, 2017

(54) SIGNAL-LEVEL BASED CONTROL OF POWER GRID LOAD SYSTEMS

(71) Applicant: PHILIPS LIGHTING HOLDING B.V., Eindhoven (NL)

(72) Inventors: Lennart Yseboodt, Eindhoven (NL); Matthias Wendt, Eindhoven (NL); Ulrich Boeke, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 253 days.

(21) Appl. No.: 14/646,396

(22) PCT Filed: Nov. 19, 2013

(86) PCT No.: PCT/IB2013/060242

§ 371 (c)(1),
(2) Date: May 21, 2015

(87) PCT Pub. No.: WO2014/080337

PCT Pub. Date: May 30, 2014

(65) Prior Publication Data

US 2015/0303687 A1 Oct. 22, 2015

Related U.S. Application Data

(60) Provisional application No. 61/729,691, filed on Nov. 26, 2012.

(51) Int. Cl.
*H02J 1/00* (2006.01)
*H05B 37/02* (2006.01)

(52) U.S. Cl.
CPC ............ *H02J 1/00* (2013.01); *H05B 37/0263* (2013.01)

(58) Field of Classification Search
CPC ............................... H02J 1/00; H05B 37/0263
(Continued)

(56) References Cited

U.S. PATENT DOCUMENTS 9,049,756 B2 * 6/2015 Klusmann .......... H05B 37/0218
2004/0021432 A1 2/2004 Lee
(Continued)

FOREIGN PATENT DOCUMENTS

DE 202012100843 5/2012
WO 2012088920 A1 7/2012
(Continued)

*Primary Examiner* — Jared Fureman
*Assistant Examiner* — Michael Warmflash

(57) ABSTRACT

The present invention relates to a load control system in which a power cable of a DC or AC is used for on/off control and dimming of connected load devices without adding significant hardware structure. The control is achieved through a change in the DC or AC bus voltage. A grid controller can perform on/off control and dimming for an entire group of connected load devices by changing the bus voltage. Connected load devices that do understand or want to make use of this feature will be unaffected. In order to reduce the effects of voltage drop, a calibration procedure is provided. The calibration procedure first triggers the connected load devices into a calibration mode and then initiates a number of predefined output level commands that allow the load devices to build an individual correction for the undesired voltage drop.

11 Claims, 3 Drawing Sheets

(58) Field of Classification Search
USPC .......................................................... 307/31
See application file for complete search history.

(56) References Cited

U.S. PATENT DOCUMENTS

| | | | | |
|---|---|---|---|---|
| 2011/0001626 | A1* | 1/2011 | Yip | H05B 37/0263 340/635 |
| 2011/0147466 | A1* | 6/2011 | Kang | H01L 25/167 235/492 |
| 2012/0002974 | A1* | 1/2012 | Schenk | H04B 10/1149 398/130 |
| 2012/0068618 | A1 | 3/2012 | Koski | |
| 2014/0225587 | A1* | 8/2014 | Waffenschmidt | H05B 37/0263 323/299 |

FOREIGN PATENT DOCUMENTS

| | | | | |
|---|---|---|---|---|
| WO | WO 2012088920 | A1 * | 7/2012 | H05B 37/0263 |
| WO | 2013171625 | A2 | 11/2013 | |

* cited by examiner

SIGNAL-LEVEL BASED CONTROL OF POWER GRID LOAD SYSTEMS

CROSS-REFERENCE TO PRIOR APPLICATIONS

This application is the U.S. National Phase application under 35 U.S.C. §371 of International Application No. PCT/IB2013/060242, filed on Nov. 19, 2013, which claims the benefit of U.S. Provisional Patent Application No. 61/729,691, filed on Nov. 26, 2012. These applications are hereby incorporated by reference herein.

FIELD OF THE INVENTION

The invention relates to the field of apparatuses and methods for controlling loads connected to a power grid. More specifically, the invention relates to on/off control and dimming of luminaires in a direct current (DC) grid lighting system.

BACKGROUND OF THE INVENTION

Conventional electric power systems were designed to move central station alternating current (AC) power, via high-voltage transmission lines and lower voltage distribution lines, to households and businesses that used the power in incandescent lights, AC motors, and other AC equipment. Today's electronic devices (such as computers, florescent lights, variable speed drives, and many other household and business appliances and equipment) need direct current (DC) input. However, all of these DC devices require conversion of the building's AC power into DC for use, and that conversion typically uses inefficient rectifiers. Moreover, DC power generated by distributed renewable power sources (such as rooftop solar) must be converted to AC to tie into the building's electric system, and must later be re-converted to DC for many end uses. These AC-DC conversions (or DC-AC-DC in the case of rooftop solar) result in substantial energy losses.

One possible solution is a DC microgrid, which is a DC grid within a building (or serving several buildings) that minimizes or eliminates these conversion losses entirely. In the DC microgrid system, AC power is converted to DC when entering the DC grid using a high-efficiency rectifier, which then distributes the power directly to DC equipment served by the DC grid. On average, such systems reduce AC to DC conversion losses from an average loss of about 10% down to 5%. In addition, roof top photovoltaic (PV) and other distributed DC generation can be fed directly to DC equipment, via the DC microgrid, without the double conversion loss (DC to AC to DC), which would be required if the DC generation output was fed into an AC system.

The major advantages of DC grids are that efficiency can be improved by centralizing part of the power drive train. For DC grids, rectification of AC power and power factor correction can be provided in a single high-power device. A further advantage is that by directly injecting the DC power from PV installations an unnecessary double conversion to and from AC can be dispensed with. This increases the effectiveness of PV installations significantly. A still further advantage is the reduced current stress of power cables since the DC voltage can be selected to be higher than the root mean square (RMS) value of a sinusoidal mains. The DC voltage is typically the peak voltage of the maximum AC mains voltage. Also there are no copper losses associated with reactive power in a DC grid, since there is no reactive power. Finally, partitioning the power in this way causes a large reduction in amount and costs of hardware.

It is much more effective to have one large rectifier and grid controller and very simple load driver (e.g., light emitting diode (LED) driver), than to have a large number of full fledged AC mains drivers, each needing mains filters, a rectifier and a PFC boost module.

Another consequence of the DC grid architecture is that fine grained control can be provided over the grid voltage. This is distinctly different from AC mains where the sinusoidal mains voltage has a varying amplitude and mains current harmonic distortions depending on the load conditions.

Conventional load control approaches (such as 0-10V, Digital Addressable Lighting Interface (DALI), Digital Multiplex (DMX), KNX, etc.) rely on a separate control cable and can also be used with DC lighting. Also powerline communication as described in the IEEE specification 1901 "IEEE Standard for Broadband over Power Line Networks" can be used. However such control solutions are usually quite complex and require additional hardware installations.

SUMMARY OF THE INVENTION

It is an object of the present invention to provide an improved power converter system capable of supplying an electrical load with a controlled DC voltage from both a local DC source as well as an AC mains, with maximum power conversion efficiency.

This object is achieved by an apparatus as claimed in claim 1 (controller side), by an apparatus as claimed in claim 2 (load side), by a method as claimed in claim 11 (controller side), by a method as claimed in claim 12 (load side), and by a computer program product as claimed in claim 15. The claimed solution is thus divided into interrelated controller-side and load-side aspects.

Accordingly, power supply via a power grid system to at least one load device is controlled by measuring a signal level of the power supply at an output of a grid controller and changing the signal level within a first predetermined range between a minimum allowed signal level and a maximum allowed signal level of the power grid system by influencing a control loop for controlling the signal level at the grid controller based on a received control command, so as to signal the control command to the at least one load device. At the load side, a signal level of the power supply at an input of the load device is measured, the measured signal level is translated into a control command if the signal level belongs to the first predetermined range, and the output (e.g. radiation power) of the load device is controlled in accordance with the control command.

Thus, the available power cable can be used for controlling purposes without adding hardware complexity and costs. Load control can thereby be incorporated in power grids (AC or DC grids) at grid controller level. No extra communication lines are needed, and no extra hardware is required in the grid controller or grid load (e.g. luminaire). The communication mechanism is based on analog voltage level readouts and can be enhanced to support (automatic) calibration to mitigate voltage drop effects in large cable networks.

According to a first aspect, the control command may be a command for switching on or off or controlling (e.g. dimming) an output of the load device. On/off control and variation of output power of load devices connected to the power grid can thus be achieved by simply changing the signal level (e.g. voltage or current level) of the power supply to pre-selected values.

According to a second aspect which can be combined with the above first aspect, the grid controller apparatus may be adapted to receive the control command from a user interface or a sensor. Thereby, the load devices connected to the power grid can be controlled by a user action (switching action, rotating action, etc.) or based on an output of a sensor (e.g. light sensor, motion sensor, touch sensor, switch sensor, etc.).

According to a third aspect which can be combined with at least one of the above first and second aspects, the signal level of the power supply may be changed based on the control command so as to be associated with a desired output level of the at least one load device according to the control command. The signal level on the power grid thus directly reflects the desired change of the output level at the connected load device. If the signal level on the power grid increases within the first predetermined range (which does not affect conventional load devices which do not support the proposed control functionality), the load device can derive that its output level shall be increased and vice versa. Moreover, specific signal levels can be used to signal on and off states of the load device.

According to a fourth aspect which can be combined with at least one of the above first to third aspects, a calibration mode may be triggered by changing the signal level to a value of a second predetermined range located above or below said first predetermined range. This provides the advantage that changes in the received signal level at the load devices due to a voltage drop along the connection cable of the power grid can be compensated by setting the load device into the calibration mode so as to calibrate its reference values. According to a specific example of the fourth aspect, the grid controller apparatus may generate a predetermined sequence of different signal levels within the first predetermined range in a predetermined order during the calibration mode. This predetermined sequence can then be measured at the load device during the calibration mode, and the measured values can be stored and used as reference values for translating a received signal level into the control command after the end of the calibration mode.

In a further aspect of the present invention, a computer program for controlling power conversion is provided, wherein the computer program comprises code means for causing the grid controller apparatus or the load device to carry out the steps of the above methods, when the computer program is run on a respective computer or computing device controlling the grid controller or the load device.

The above apparatus and control system may be implemented as a hardware circuit, single chip or chip set which can be mounted to a circuit board. The chip or chip set may comprises a processor which is controlled by program or software routine.

It shall be understood that the substance determining the apparatus of claim 1 or 2, the method of claim 11 or 12, and the computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

The following embodiments are related to an improved control system for a DC grid lighting system based on a DC microgrid where the power cable is used for control signaling purposes without adding significant hardware and costs. Using this mechanism allows all luminaires or other load devices that are connected to the same grid controller to be dimmed, turned on/off or otherwise controlled as a group. Hence, it is a highly efficient and ultra low cost solution for group based control.

The proposed solution according to the following embodiments will also not introduce any complex problems associated with mains dimming (e.g., phase cutting control, phase angle control or the like). It is fully compatible with DC capable conventional load devices that do not make use of the proposed control function.

Figure 1:
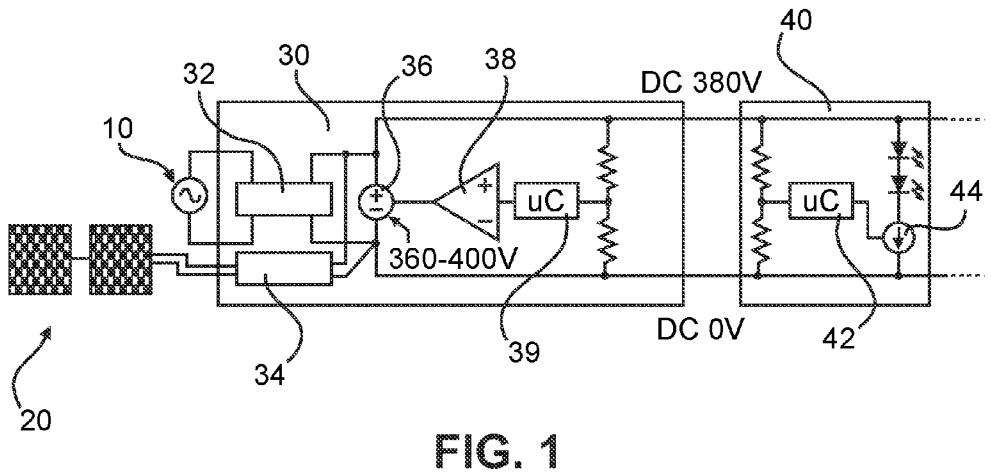
FIG. 1 shows a schematic block diagram of a control system according to various embodiments.

FIG. 1 shows a schematic block diagram of a control system according to various embodiments with a DC grid controller 30 and an exemplary DC grid luminaire 40 as load device. The grid controller 30 can accept power from any number of power sources, such as an AC mains 10, a battery and/or one or a string of PV panels or modules 20 or other renewables, flywheels, or the like. The controlled DC microgrid of FIG. 1 may be used in a lighting application of a professional building where the controlled loads (e.g., the DC grid luminaire 40) may comprise lighting fixtures tailored towards the DC grid.

The DC power is thus controlled in a centralized fashion by the DC grid controller 30 which comprises a high power AC mains rectifier and power factor correction or compensation (PFC) unit 32 that can also accept power from other sources, such as the PV modules 20. The grid controller 30 may attempt to make optimum use of the PV modules 20 through a maximum power point tracking (MPPT) unit 34 and supplements the DC grid with AC mains power when the PV installation cannot meet the power demand.

Furthermore, the grid controller 30 comprises a local microcontroller 39 which performs control so as to alter or change the DC output voltage as a signal level of the power supply. This can be achieved through manipulating a control loop of the rectifier/PFC unit 32. There are many practical ways to do this. As an example, use could be made of a Digital to Analog converter (DAC) 38 and summing resistors (not shown) to an error amplifier (not shown) in a DC output regulator 36. Controlling the DC output regulator 36 (and not to the rectifier/PFC unit 32) provides the advantage that the DC output regulator 36 is always available, while in some conditions the regulator of the rectifier/PFC unit 32 is shut down and voltage regulation is perhaps done by the PV module 34.

According to various embodiments, a dim level (e.g., from an off level to a full-power level) is signaled using only the two power connections of the DC grid to the luminaire(s) 40. To achieve this, the microcontroller 39 of the grid controller 30 can receive and accept control commands from either a user or a (remote) sensor which may be coupled with a user interface (e.g., light switch, remote control or the like). The microcontroller 39 is then adapted to influence the control loop of the grid controller 30, e.g., in the above described manner, so as to change the DC output voltage based on the received user commands.

The grid controller 30 can be a 'main' grid controller, converting AC to DC, or a smaller section or floor level DC to DC grid controller in larger installations. The grid controller 30 can be adapted to change the output voltage of the DC output regulator 36 in a first predetermined range (e.g., a full range between a minimum voltage level (e.g. 360V) and a maximum voltage level (e.g. 400V) allowed for DC grids, wherein the output voltage is measured locally at the output terminals of the grid controller 30 and forwarded to an input of the microcontroller 39 via a voltage divider circuit depicted in FIG. 1 as a series connection of two resistors.

As shown in FIG. 1, the DC luminaire 40 can also include a microcontroller 42 that controls a current source 44 so as to influence the amount of current flowing through its light emitting elements, e.g., LEDs, and thus its output power (i.e. radiation power) based on a translation of a measured voltage level at the power supply input into the control command signaled from the grid controller 30. As an alternative, it is also possible to achieve the same output control functionality in an analog way. Such an analog control can be achieved via pulse width modulation (PWM) dimming or via direct current control. In both cases, the DC luminaire 40 must be able to sense or measure the local DC grid voltage at its power supply input terminals via a voltage divider similar to the grid controller 30.

The proposed control mechanism for dimming and on/off control of the DC luminaire 40 can be fully compatible with devices that do not make use of the proposed control feature. Such conventional devices or loads will only see small variations of the DC bus voltage within specified limits of operation.

With the proposed control system according to the embodiments, on/off control, dimming and/or other load control is now possible through a change in the DC bus voltage within a predetermined range. Many schemes are possible and only some examples are described in the following embodiments.

Figure 2:
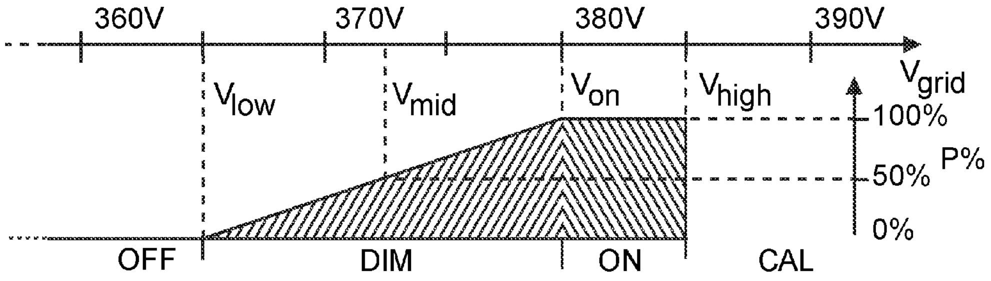
FIG. 2 shows a diagram indicating operating states for various DC grid voltages, according to a first embodiment.

FIG. 2 shows a diagram indicating operating states for various DC grid voltages $V_{grid}$, according to a first embodiment. In this example, a nominal bus voltage of e.g. $380V_{DC}$ is assumed. The nominal bus voltage can be used in the embodiments to indicate 100% relative output power level $P_{\%}$ and can thus be used as reference voltage ($V_{on}$) which is below the maximum allowed voltage ($V_{high}$) which can be set to $386V_{DC}$ in the present example, while the minimum allowed bus voltage can be set to $360V_{DC}$. Then, a voltage level of $365V_{DC}$ can be used to indicate 0% power or off-level ($V_{low}$). All values between the 100% level and the 0% level may then linearily correspond to the requested dimming value (e.g., $372.5V_{DC}$ corresponds to 50% dimming (i.e. $V_{mid}$). Of course, other non-linear relations may be possible as well, if desired.

The DC grid controller 30 can now perform on/off control and dimming for an entire group of connected DC luminaire(s) 40 or other loads or devices by suitably changing the DC bus voltage within the above first predetermined range. Devices that are not adapted or triggered to interpret or to make use of this control feature will be unaffected. At lower voltages within the first predetermined range they will draw slightly more current if they are 'constant power' type of devices like LED drivers.

Being able to change the grid voltage, the grid controller 30 can now signal at least the following control commands via the voltage level to initiate corresponding control actions:

off-command: To turn the DC luminaire(s) 40 off (OFF mode in FIG. 2), the voltage is reduced to below the $V_{low}$ voltage, this will signal to the microcontroller(s) 42 in the DC luminaire(s) 40 that they need to shut down;

dim-command: To dim, the voltage needs to be $V_{low}<V_{grid}<V_{on}$ (DIM mode in FIG. 2) and the relative output power of the DC luminaire(s) 40 will be:

$$P_{\%} = \frac{V_{grid} - V_{low}}{V_{on} - V_{low}} \tag{1}$$

on-command: To turn the luminaires to full output power (ON mode in FIG. 2), the grid voltage must exceed $V_{on}$, but not higher than $V_{high}$.

As far as the DC luminaire 40 is concerned, it only needs to measure the input voltage, translate the measured value into the associated control command, e.g. based on a comparison with stored reference values, and depending on the derived control command, perform proper light adjustments, e.g., adjust the output current by the current source 44 or change the PWM duty cycle. In the first embodiment, the voltage level for signaling an optional calibration mode (CAL) is selected from a second predetermined range above the on-voltage threshold $V_{on}$. Thus, any voltage level higher than the on-voltage threshold $V_{high}$ (i.e. maximum allowed bus voltage) will set the DC luminaire into the calibration mode (CAL). The optional calibration mode (CAL) is described later in connection with the third embodiment.

Figure 3:
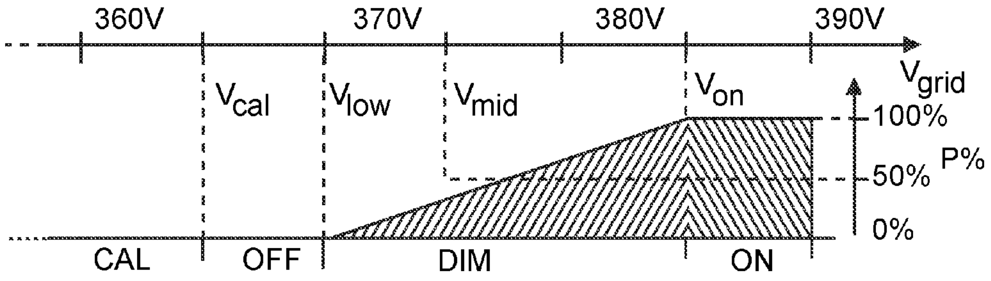
FIG. 3 shows a diagram indicating operating states for various DC grid voltages, according to a second embodiment.

FIG. 3 shows a diagram indicating operating states for various DC grid voltages, according to a second embodiment, where the voltage level for signaling the optional calibration mode (CAL) is set below the off-voltage threshold (i.e. the minimum allowed bus voltage) rather than above the on-voltage threshold (i.e. minimum allowed bus voltage). Thus, the second predetermined range is located below the minimum allowed bus voltage and any voltage level below the off-voltage threshold will set the DC luminaire 40 into the calibration mode (CAL).

The control mechanisms according to the above first and second embodiments, as described so far, do not take into account the effect of a voltage drop over the cables of the DC grid. The control range 0% to 100% of the dim level is based on small voltage level variations (e.g. 365V to 380V), which is critical on grids with long cables or large loads. Not correcting for voltage drop could result in unequal dimming levels, or even luminaires turning off when they should be at low dim levels. The reason for this is that due to the non-zero resistance of the cable, the voltage becomes progressively lower as more current is drawn, which generates higher voltage drops along the cable. Thus, also the length of the cable and the location of power consumers have substantial influence on the resulting voltage drop.

This detrimental effect is in this context even more complicated because it has a non-linear behavior. As already mentioned above, an LED driver behaves basically as a 'constant power sink'. Regardless of the input voltage, it will try to consume the same amount of power. A reduced input voltage thus causes an increase in current, which in turn again causes more cable losses and less input voltage until an equilibrium is reached. In a system with multiple consumers (e.g. loads, luminaires or other power consuming devices of the DC grid) it is difficult or impossible to accurately determine what the input voltage for a given device will be at certain load conditions (without performing a measurement). A proposed calibration mechanism according to the following third embodiment can overcome this problem.

Figure 4:
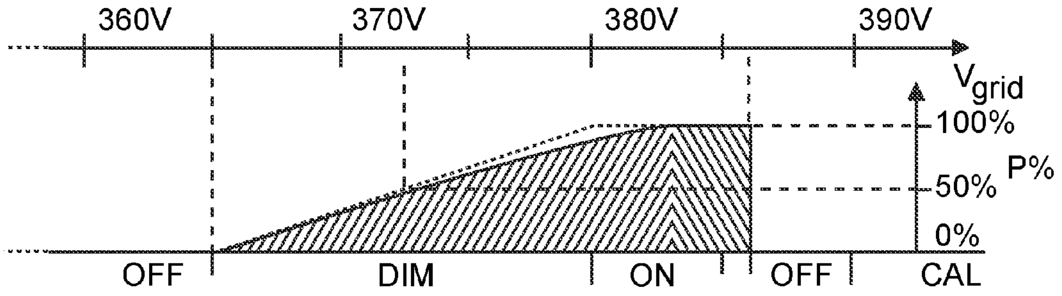
FIG. 4 shows a diagram indicating operating states for various DC grid voltages including a calibration state according to a third embodiment.

FIG. 4 shows a diagram indicating operating states for various DC grid voltages including a calibration state according to the third embodiment. In FIG. 4, both error curve and calibration state (explained later) are shown. The bold line shows the behavior when voltage drop is taken into account, while the dotted line shows the desired ideal behavior. For certain load conditions, it is not easily possible to calculate the expected input voltage. For this reason, the control function may be implemented based on local measurements. Due to the fact that the system may not have digital two-way communication, the calibration functionality could rely on a strictly specified way to perform the calibration, making use of the DC bus voltage to mark events. It can thus be implemented (e.g. in the respective microprocessors 39 and 42) as a pure software implementation based on an algorithm.

The proposed calibration procedure serves to reduce the effects of voltage drop by a one-way communication from the grid controller 30 to the connected load devices (e.g. DC luminaire(s) 40), by changing the grid voltage. More, specifically, the calibration procedure is initiated by first triggering the connected load devices into a calibration mode (CAL). This is followed by a number of predefined steps that allow the connected devices to build an individual correction for the observed voltage drop.

Figure 5:
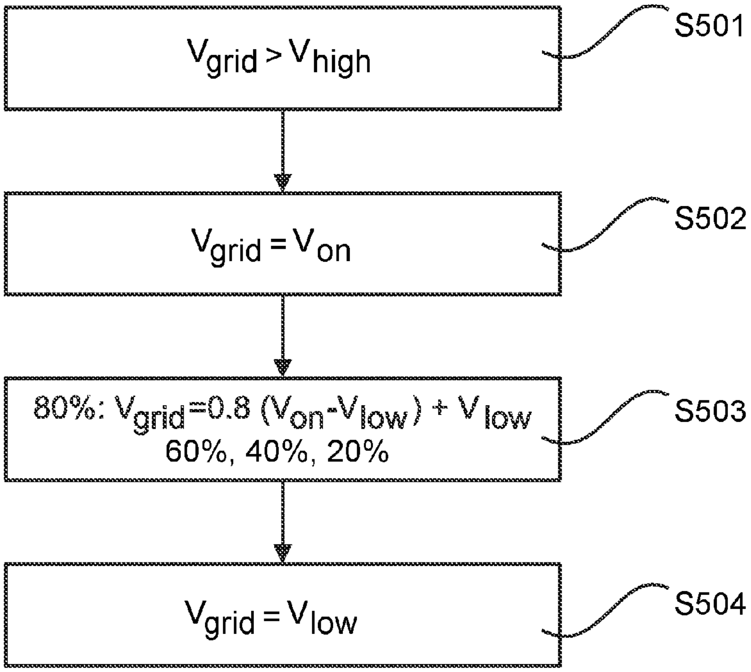
FIG. 5 shows a flow diagram of the calibration procedure according to the third embodiment.

FIG. 5 shows a flow diagram of the timed calibration procedure according to the third embodiment. In the first and third embodiments of FIGS. 2 and 4, the grid controller 30 is adapted to trigger the calibration mode by increasing the grid voltage to the second predetermined range beyond the maximum allowed bus voltage $V_{high}$. This is done in step S501. However, the voltage should never exceed a predetermined maximum safe grid voltage as an upper limit of the second predetermined range. Using a high voltage to trigger the calibration state has the advantage that an avalanche effect is achieved even under heavy load. The load devices closest to the grid controller 30 would observe or detect this trigger voltage first and turn off. This would reduce the load on the cable or line and trigger additional load devices into their calibration mode causing them to turn off also. Then, still in step S501, the grid controller 30 is adapted to make sure that a stable condition exists. This means that load conditions should be constant now (i.e., no more load devices are turned off). Once it is determined that this is the case, the actual calibration procedure will begin.

In step S502 the grid voltage is decreased to the on-level voltage $V_{on}$ within the first predetermined range. This marks the start of the timed calibration procedure in both the grid controller 30 and the load devices (e.g. DC luminaire(s) 40). All load devices connected to the DC grid will see this decrease in grid voltage and will turn to 100% power. As soon as a stable condition is reached, the connected load devices will store into a memory a value of their input voltage they measured. Then, in step S503, the grid controller 30 is adapted to step through the dimming voltages within the first predetermined range in predetermined steps at a predetermined order (eg. 100%, 80%, 60%, 40%, 20%). Again, every time the connected load devices can measure the input voltage and store the measuring result in their memory. Obviously, each load device will see a different input voltage, caused by the specific load condition of that situation.

In step S504, the grid controller 30 reduces the grid voltage to off-level voltage $V_{low}$, allowing the load devices to determine their turn-off point.

The grid controller 30 can obviously use slightly higher values for the on-level voltage $V_{on}$ and slightly lower values for the off-level value Voff to get some error margin with regards to the calibration in normal usage conditions.

The following table shows the sequence of actions on both signaling ends during the above calibration procedure according to the third embodiment for a calibration of the DC luminaire 40.

| Grid controller | Luminaire |
|---|---|
| $V_{grid}$ increased beyond $V_{high}$ | LED current to zero, 'enter calibration mode' |
| $V_{grid} = V_{on}$ | LED current to 100%<br>Wait for stability<br>Store measured voltage $V'_{on}$ |
| $V_{grid} = 80\% \cdot (V_{on} - V_{low}) + V_{low}$ | LED current to 80%<br>Wait for stability<br>Store measured voltage $V'_{80\%}$ |
| Repeat for 60%, 40%, 20% | Repeat for 60%, 40%, 20% |
| $<V_{grid} = V_{low}$ | LED current to 0%<br>Wait for stability<br>Store measured voltage $V'_{low}$ |

All transitions of the calibration procedure may have a strictly specified time interval to allow synchronization between the grid controller 30 and DC luminaire(s) 40.

After the calibration procedure is completed the connected load devices (e.g. DC luminaire(s) 40) can correct their translations of measured values and derived control actions to compensate for the effects of the voltage drop along the cable or line of the DC grid. The calibration step can be repeated every time a change in the grid occurs (e.g., device added, moved, or removed). This can be done automatically by the grid controller 30 without any manual intervention.

The grid controller 30 can also automatically detect changes in the DC grid (e.g., change in the power level) and perform a calibration procedure before issuing new commands.

Synchronization of events may happen partially by exceeding certain voltage levels (e.g. changing to calibration mode), and by mutual knowledge of the duration of certain phases in combination with voltage level changes. (e.g. calibration of the dimming phase).

Figure 6:
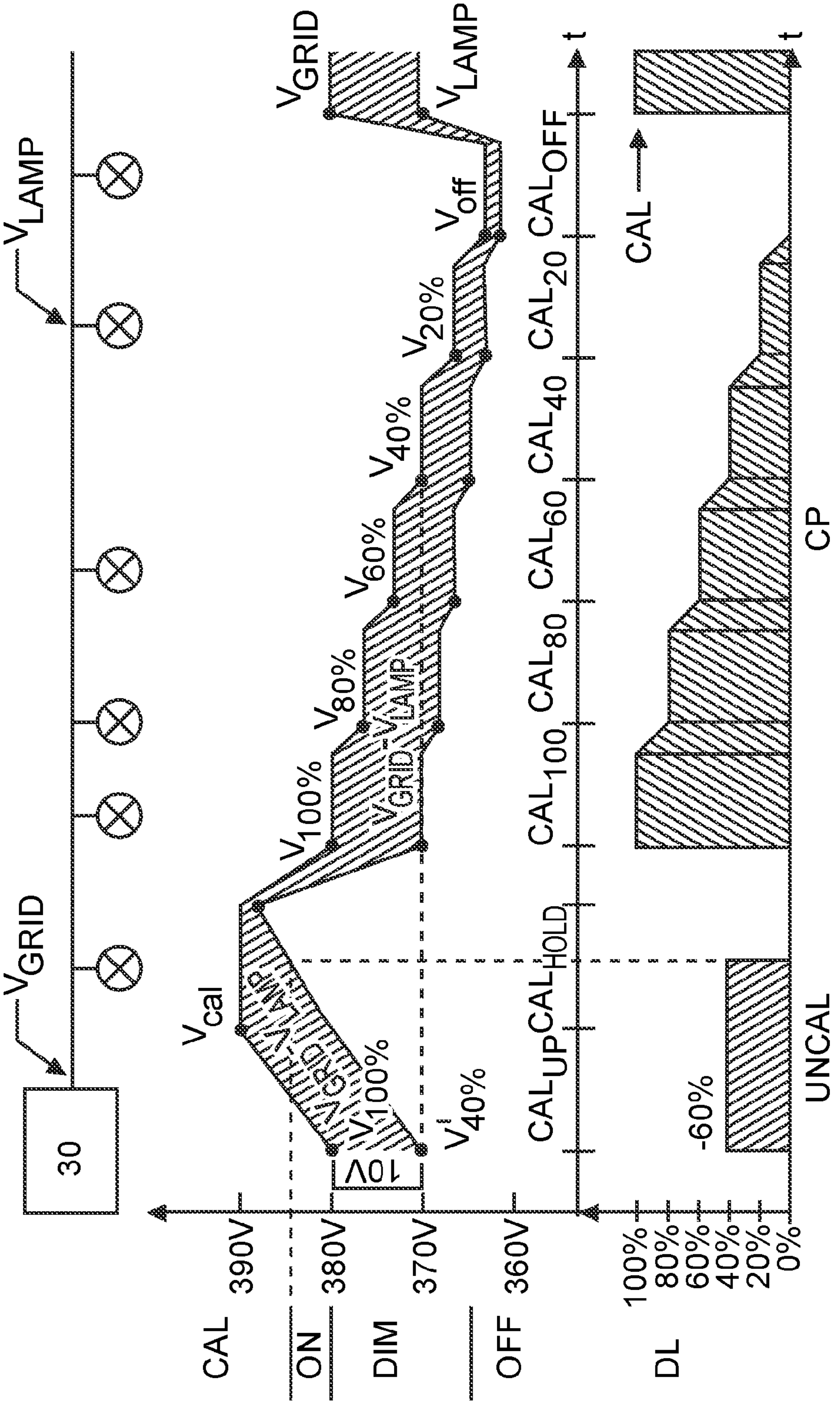
FIG. 6 shows a diagram with an overview over the calibration procedure according to the third embodiment.

FIG. 6 shows a diagram with an overview over the calibration procedure according to the third embodiment with the voltage levels and timings in more detail. Two voltages ($V_{grid}$ and $V_{lamp}$) and their change during the calibration procedure according to the third embodiment are shown in a first graph in the upper time diagram where the horizontal axis is a time axis and the vertical axis indicates the measured voltage values. The lower time diagram shows a second graph of the light output (i.e., dim level (DL)) at each part in the calibration process. The area between the graphs of the two voltages ($V_{grid}$ and $V_{lamp}$) in the upper time diagram indicates an (exaggerated) voltage drop and resulting effects. In the example of FIG. 6, the cable loss between the grid controller output ($V_{grid}$) and the observed luminaire input ($V_{lamp}$) at full load results in a voltage drop of 10V.

The starting condition is an output voltage of 380V at the grid controller 30 and a measured voltage of 370V at the input of the luminaire 40 (due to the voltage drop of 10V along the connection cable of the DC grid). Because it is not calibrated, the luminaire 40 misinterprets this as a 40% dimming level $V'_{40\%}$, so that an error of 60% is observed at the dimming level in the uncalibrated state (UNCAL). Now, the calibration starts with the ramp up ($CAL_{UP}$) to the calibration trigger voltage $V_{cal}$ during which all luminairs turn off, followed by a calibration holding period ($CAL_{HOLD}$). Next, the grid controller 30 proceeds through all the dimming calibration steps $CAL_{100}$ to $CAL_{OFF}$. The luminaire 40 is adapted to match its light output with each step based on the measured input voltage. The final action is returning to normal mode by going to 100% relative power.

Thus, according to the third embodiment, an (automatic) calibration procedure is introduced to compensate for voltage drops in large cable networks.

The proposed control system according to the first to third embodiments is compatible with non-dimmable devices and is not limited to the exemplary 380V DC system. It could also be applied in IEEE802.3 compliant power over Ethernet (PoE) systems to allow luminairs without PoE communication option to have dimming functionality. The light source or luminaire may be a high-intensity discharge (HID) lamps, a low pressure mercury discharge lamp, a LED lamp, or an array of LEDs and/or HIDs. Furthermore, the HID lamp may be a mercury vapor lamp, a metal halide (MH) lamp, a ceramic MH lamp, a sodium vapor lamps, a xenon short-arc lamp, or other type of lamp.

More generally, the proposed on/off and dimming control and calibration can be used in various DC (and even AC) grid applications where fine grained control of the grid voltage is possible. It is relevant for any type of application where a dimmable behavior is desired. The present invention is thus not limited to the described lighting applications of the embodiments. Rather, the controlled load device can be any other electrical load like a fan, a sensor, a motor, a variable speed driver etc. Moreover, the present invention is not limited to a load control via the grid voltage level. The control commands may as well be signaled via the grid current supplied by the grid controller 30 to the DC or AC grid.

Furthermore, the grid controller 30 of the first to third embodiments may comprise a user interface for allowing a user to control the connected load devices by modifying the DC grid voltage. The user interface may be implemented as an electrical input setting unit which is connected with the grid controller 30 via a wired or wireless data connection for allowing a user to issue control commands via the output voltage of the grid controller 30. The electrical input setting unit can be an external unit, which is located remote from the building or it can be an internal unit, which is located within the building of the DC grid. As another option the electrical input setting unit may be connected with the grid controller 30 via the Internet such that the connected load devices can be controlled via the Internet.

Other variations to the disclosed embodiments can be understood and effected by those skilled in the art in practicing the claimed invention, from a study of the drawings, the disclosure, and the appended claims. In particular, at least two of the above control and calibration procedures of the first to third embodiments can be combined in a single embodiment.

To summarize, the present invention relates to load control system in which a power cable of a DC or AC is used for on/off control and dimming of connected load devices without adding significant hardware structure. The control is achieved through a change in the DC or AC bus voltage. A grid controller can perform on/off control and dimming for an entire group of connected load devices by changing the bus voltage. Connected load devices that do understand or want to make use of this feature will be unaffected. In order to reduce the effects of voltage drop, a calibration procedure is provided. The calibration procedure first triggers the connected load devices into a calibration mode and then initiates a number of predefined output level commands that allow the load devices to build an individual correction for the undesired voltage drop.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The above processing and/or control steps of the grid controller 30 and the luminaire 40 of the architecture of FIG. 1 can be implemented as program code means of a computer program and/or as dedicated hardware. The related computer program may be stored/distributed on a suitable medium, such as an optical storage medium or a solid-state medium, supplied together with or as part of other hardware, but may also be distributed in other forms, such as via the Internet or other wired or wireless telecommunication systems.

A computer program may be stored or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus for controlling power supply via a power grid system to at least one load device, said apparatus being adapted to measure a signal level of said power supply at an output of a grid controller and to change said signal level within a first predetermined range between a minimum allowed signal level and a maximum allowed signal level of said power grid system by influencing a control loop for controlling said signal level based on a received control command, so as to signal said control command to said at least one load device, wherein said apparatus is adapted to trigger a calibration mode by changing said signal level to a value of a second predetermined range located above or below said first predetermined range.

2. The apparatus according to claim 1, wherein said power grid system is a direct current, DC, power grid system and wherein said signal level is a voltage level.

3. The apparatus according to claim 1, wherein said control command is a command for switching on or off or controlling an output of said load device.

4. The apparatus according to claim 1, wherein said apparatus is adapted to receive said control command from a user interface or a sensor.

5. The apparatus according to claim 1, wherein said apparatus is adapted to change said signal level so as to be associated with a desired output level of said at least one load device (40) according to said control command.

6. The apparatus according to claim 1, wherein said apparatus is adapted to generate a predetermined sequence of different signal levels within said first predetermined range in a predetermined order during said calibration mode.

7. An apparatus for controlling an output of a load device connected to a power grid system, said apparatus being adapted to measure a signal level of said power supply at an input of said load device, to translate said signal level into a control command if said signal level belongs to a first predetermined range between a minimum allowed signal level and a maximum allowed signal level of said power grid system, and to change said output in accordance with said control command, wherein said apparatus is adapted to set said load device into a calibration mode in response to a measured signal level in a second predetermined range located above or below said first predetermined range.

8. The apparatus according to claim 7, wherein said apparatus is adapted to measure a predetermined sequence of different signal levels within said first predetermined range during said calibration mode, to store said measured values, and to use said stored values for translating said received signal level into said control command after said calibration mode.

9. A method of controlling power supply via a power grid system to at least one load device, said method comprising measuring a signal level of said power supply at an output of a grid controller device, and changing said signal level within a first predetermined range between a minimum allowed signal level and a maximum allowed signal level of said power grid system by influencing a control loop for controlling said signal level based on a received control command, so as to signal said control command to said at least one load device, said method further comprising triggering a calibration mode by changing said signal level to a value of a second predetermined range located above or below said first predetermined range, and generating a predetermined sequence of different signal levels within said first predetermined range in a predetermined order during said calibration mode.

10. A method of controlling an output of a load device connected to a power grid system, said method comprising measuring a signal level of said power supply at an input of said load device, translating said signal level into a control command when said signal level belongs to a first predetermined range between a minimum allowed signal level and a maximum allowed signal level of said power grid system, and changing said output in accordance with said control command, said method further comprising setting said load device (40) into a calibration mode in response to a measured signal level in a second predetermined range located above or below said first predetermined range, measuring a predetermined sequence of different signal levels within said first predetermined range during said calibration mode, storing said measured values, and using said stored values for translating said received signal level into said control command after said calibration mode.

11. A non-transitory computer readable storage medium including a computer program including a set of instructions executable by a processor to control a power supply via a power grid system to at least one load device, the computer readable storage medium comprising code for: measuring a signal level of said power supply at an output of a grid controller device, and changing said signal level within a first predetermined range between a minimum allowed signal level and a maximum allowed signal level of said power grid system by influencing a control loop for controlling said signal level based on a received control command, so as to signal said control command to said at least one load device, said method further comprising triggering a calibration mode by changing said signal level to a value of a second predetermined range located above or below said first predetermined range, and generating a predetermined sequence of different signal levels within said first predetermined range in a predetermined order during said calibration mode.

* * * * *